United States Patent
Ohmori

(10) Patent No.: US 12,454,313 B2
(45) Date of Patent: Oct. 28, 2025

(54) MOTION CONTROL DEVICE FOR VEHICLE, COMPUTER-READABLE MEDIUM THAT STORES MOTION CONTROL PROGRAM, AND MOTION CONTROL METHOD FOR VEHICLE

(71) Applicants: ADVICS CO., LTD., Kariya (JP); J-QUAD DYNAMICS INC., Tokyo (JP); DENSO CORPORATION, Kariya (JP); AISIN CORPORATION, Kariya (JP); JTEKT CORPORATION, Kariya (JP)

(72) Inventor: Yosuke Ohmori, Tokyo (JP)

(73) Assignees: ADVICS CO., LTD., Kariya (JP); J-QuAD DYNAMICS INC., Tokyo (JP); DENSO CORPORATION, Kariya (JP); AISIN CORPORATION, Kariya (JP); JTEKT CORPORATION, Kariya (JP)

( * ) Notice: Subject to any disclaimer, the term of this patent is extended or adjusted under 35 U.S.C. 154(b) by 397 days.

(21) Appl. No.: 18/159,854

(22) Filed: Jan. 26, 2023

(65) Prior Publication Data
US 2023/0278624 A1 Sep. 7, 2023

(30) Foreign Application Priority Data
Jan. 31, 2022 (JP) .................... 2022-013222

(51) Int. Cl.
*B62D 7/15* (2006.01)
*B62D 6/00* (2006.01)

(52) U.S. Cl.
CPC ................. *B62D 7/15* (2013.01); *B62D 6/00* (2013.01)

(58) Field of Classification Search
CPC .......... B62D 7/15; B62D 6/00; B62D 5/0481; B62D 5/0484; B62D 6/002; B62D 7/159;
(Continued)

(56) References Cited

U.S. PATENT DOCUMENTS

2005/0203646 A1 9/2005 Makino et al.
2008/0097671 A1 4/2008 Kojo et al.
(Continued)

FOREIGN PATENT DOCUMENTS

CN 116848036 A * 10/2023 ............. B62D 7/159
DE 102011085422 A1 * 5/2012 ............. B62D 6/003
(Continued)

OTHER PUBLICATIONS

Notice of Reasons for Refusal issued on Aug. 26, 2025, by the Japanese Patent Office in Japanese Patent Application No. 2022-013222 and an English translation of the Notice. (7 pages).

*Primary Examiner* — Drew J Brown
(74) *Attorney, Agent, or Firm* — BUCHANAN INGERSOLL & ROONEY PC

(57) ABSTRACT

A motion control device includes a request value acquisition unit that obtains a motion amount request value, a limit value setting unit that sets first to third motion amount limit values, a first command unit that sends a first motion amount command value based on the motion amount request value and a first motion amount limit value to a front wheel steering controller, a second command unit that sends a second motion amount command value based on a first remaining request value and a second motion amount limit value to a rear wheel steering controller, and a third command unit that sends a command corresponding to a third motion amount command value based on a second remaining request value and a third motion amount limit value to a driving controller and a braking controller.

7 Claims, 8 Drawing Sheets

(58) Field of Classification Search
CPC ..... B62D 15/025; B62D 6/008; B60W 10/18; B60W 10/20; B60W 30/045; B60W 10/04; B60W 40/00; B60W 2710/06; B60W 2710/08; B60W 2710/18; B60W 2710/20

See application file for complete search history.

(56) References Cited

U.S. PATENT DOCUMENTS

2012/0109460 A1  5/2012  Tokimasa et al.
2013/0253770 A1* 9/2013  Nishikawa .......... B60W 50/023
                                                      701/1

FOREIGN PATENT DOCUMENTS

| JP | 2006-111210 A  |   | 4/2006  |        |              |
|----|----------------|---|---------|--------|--------------|
| JP | 2009274701 A   | * | 11/2009 |        |              |
| JP | 4379793 B2     |   | 12/2009 |        |              |
| JP | 2010228690 A   | * | 10/2010 | ...... | B60W 30/045  |
| JP | 2012-096621 A  |   | 5/2012  |        |              |
| KR | 20250040876 A  | * | 3/2025  | ...... | B60W 30/18172|
| RU | 2754021 C1     | * | 8/2021  | ...... | B60W 10/06   |
| WO | WO-2024247366 A1 | * | 12/2024 | ...... | B60W 10/184 |

* cited by examiner

MOTION CONTROL DEVICE FOR VEHICLE, COMPUTER-READABLE MEDIUM THAT STORES MOTION CONTROL PROGRAM, AND MOTION CONTROL METHOD FOR VEHICLE

1. FIELD

The present disclosure relates to a motion control device for a vehicle, a computer-readable medium that stores a motion control program, and a motion control method for a vehicle.

2. DESCRIPTION OF RELATED ART

Japanese Patent No. 4379793 discloses that when a controller for an electric power steering apparatus receives commands from microcomputers of command units, the controller activates an actuator of the electric power steering apparatus in accordance with the commands received from the microcomputers. The controller for the electric power steering apparatus determines whether an anomaly has occurred in the microcomputer of each command unit. Then, the controller activates the actuator based on the command from a microcomputer that is determined as having no anomaly. When receiving a command from a microcomputer that is determined as having an anomaly, the controller does not activate the actuator based on that command.

The vehicle includes multiple actuators each capable of producing a yaw moment in the vehicle. In such a vehicle, some of the actuators may be unable to be activated normally.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a motion control device for a vehicle. The vehicle includes a steering wheel, wheels that include a front wheel and a rear wheel, a front wheel steering shaft that operates as the steering wheel rotates, a front wheel steering actuator that adjusts a steered angle of the front wheel, a rear wheel steering actuator that adjusts a steered angle of the rear wheel, and a longitudinal force adjustment actuator that adjusts longitudinal forces of the wheels. The motion control device includes: a request value acquisition unit configured to obtain a motion amount request value that is a request value of a motion amount of the vehicle used to turn the vehicle; a limit value setting unit configured to set a first motion amount limit value in correspondence with a range that enables the front wheel steering actuator to be activated, set a second motion amount limit value in correspondence with a range that enables the rear wheel steering actuator to be activated, and set a third motion amount limit value in correspondence with a range that enables the longitudinal force adjustment actuator to be activated: a first command unit configured to obtain, as a first motion amount command value, a value corresponding to a smaller one of the motion amount request value and the first motion amount limit value and command the front wheel steering actuator to be activated based on the first motion amount command value: a second command unit configured to obtain, as a second motion amount command value, a value corresponding to a smaller one of the second motion amount limit value and a first remaining request value obtained by subtracting the first motion amount command value from the motion amount request value and command the rear wheel steering actuator to be activated based on the second motion amount command value; and a third command unit configured to obtain, as a third motion amount command value, a value corresponding to a smaller one of the third motion amount limit value and a second remaining request value obtained by subtracting the second motion amount command value from the first remaining request value and command the longitudinal force adjustment actuator to be activated based on the third motion amount command value.

The above motion control device can set each motion amount limit value in accordance with the range at the moment that enables the corresponding actuator to be activated. Thus, the motion control device can set the first motion amount command value to a value that can be achieved by activating the front wheel steering actuator. The motion control device can set the second motion amount command value to a value that can be achieved by activating the rear wheel steering actuator. The motion control device can set the second motion amount command value to a value that can be achieved by activating the longitudinal force adjustment steering actuator. Further, for example, the motion control device commands the controller for an actuator to activate the actuator based on such a command value so that the vehicle can turn in accordance with the motion request value.

Accordingly, even when some of the actuators cannot be activated normally, the vehicle can be turned.

Another aspect of the present disclosure provides a computer-readable medium that stores a motion control program executed by an execution device of a vehicle. The vehicle includes a steering wheel, wheels that include a front wheel and a rear wheel, a front wheel steering shaft that operates as the steering wheel rotates, a front wheel steering actuator that adjusts a steered angle of the front wheel, a rear wheel steering actuator that adjusts a steered angle of the rear wheel, and a longitudinal force adjustment actuator that adjusts longitudinal forces of the wheels. The motion control program causes the execution device to execute: a request value acquisition process that obtains a motion amount request value that is a request value of a motion amount of the vehicle used to turn the vehicle: a limit value setting process that sets a first motion amount limit value in correspondence with a range that enables the front wheel steering actuator to be activated, sets a second motion amount limit value in correspondence with a range that enables the rear wheel steering actuator to be activated, and sets a third motion amount limit value in correspondence with a range that enables the longitudinal force adjustment actuator to be activated; a first command value acquisition process that obtains, as a first motion amount command value, a value corresponding to a smaller one of the motion amount request value and the first motion amount limit value: a second command value acquisition process that obtains, as a second motion amount command value, a value corresponding to a smaller one of the second motion amount limit value and a first remaining request value obtained by subtracting the first motion amount command value from the motion amount request value: a third command value acquisition process that obtains, as a third motion amount command value, a value corresponding to a smaller one of the third motion amount limit value and a second remaining request value obtained by subtracting the second motion amount command value from the first remaining request value; and a command process that commands the front wheel steering actuator to be activated based on the first motion amount command value, commands the rear wheel steering actuator to be activated based on the second motion amount command value, and commands the longitudinal force adjustment actuator to be activated based on the third motion amount command value.

A further aspect of the present disclosure provides a motion control method for a vehicle. The vehicle includes a steering wheel, wheels that include a front wheel and a rear wheel, a front wheel steering shaft that operates as the steering wheel rotates, a front wheel steering actuator that adjusts a steered angle of the front wheel, a rear wheel steering actuator that adjusts a steered angle of the rear wheel, and a longitudinal force adjustment actuator that adjusts longitudinal forces of the wheels. The motion control method includes: obtaining a motion amount request value that is a request value of a motion amount of the vehicle used to turn the vehicle: setting a first motion amount limit value in correspondence with a range that enables the front wheel steering actuator to be activated: setting a second motion amount limit value in correspondence with a range that enables the rear wheel steering actuator to be activated: setting a third motion amount limit value in correspondence with a range that enables the longitudinal force adjustment actuator to be activated; obtaining, as a first motion amount command value, a value corresponding to a smaller one of the motion amount request value and the first motion amount limit value; obtaining, as a second motion amount command value, a value corresponding to a smaller one of the second motion amount limit value and a first remaining request value obtained by subtracting the first motion amount command value from the motion amount request value: obtaining, as a third motion amount command value, a value corresponding to a smaller one of the third motion amount limit value and a second remaining request value obtained by subtracting the second motion amount command value from the first remaining request value: commanding the front wheel steering actuator to be activated based on the first motion amount command value: commanding the rear wheel steering actuator to be activated based on the second motion amount command value; and commanding the longitudinal force adjustment actuator to be activated based on the third motion amount command value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of the present disclosure will now be described with reference to FIGS. 1 to 8.

Figure 1:
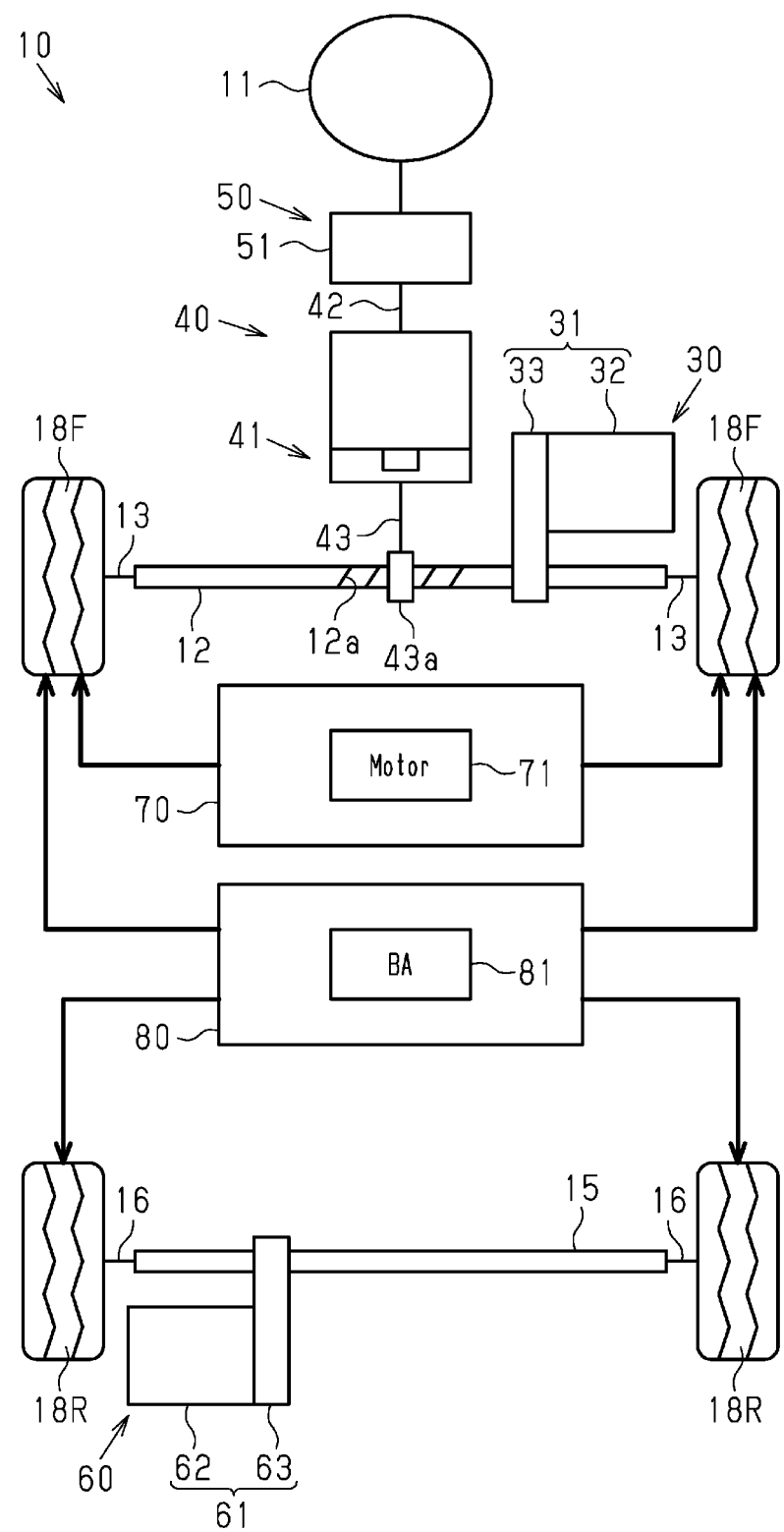
FIG. 1 is a diagram schematically showing a vehicle in which a motion control device according to an embodiment is employed.

FIG. 1 schematically shows the configuration of a vehicle 10 in which a motion control device 130 of the present embodiment is employed.

Vehicle

As shown in FIG. 1, the vehicle 10 includes a steering wheel 11, a front wheel steering shaft 12, a rear wheel steering shaft 15, and wheels 18F and 18R. The wheels 18F, 18R include front wheels 18F and rear wheels 18R.

The steering wheel 11 is rotated by an operation of a driver of the vehicle 10. Of two directions along the axis of the front wheel steering shaft 12, the front wheel steering shaft 12 moves straight in a direction corresponding to the rotation direction of the steering wheel 11. Each front wheel 18F is coupled to the front wheel steering shaft 12 by a tie rod 13. When the front wheel steering shaft 12 moves straight, the front wheel 18F is steered in a direction corresponding to the direction of the movement.

The rear wheel steering shaft 15 is movable straight in two directions along the axis of the rear wheel steering shaft 15. Each rear wheel 18R is coupled to the rear wheel steering shaft 15 by a tie rod 16. When the rear wheel steering shaft 15 moves straight, the rear wheel 18R is steered in a direction corresponding to the direction of the movement.

Figure 2:
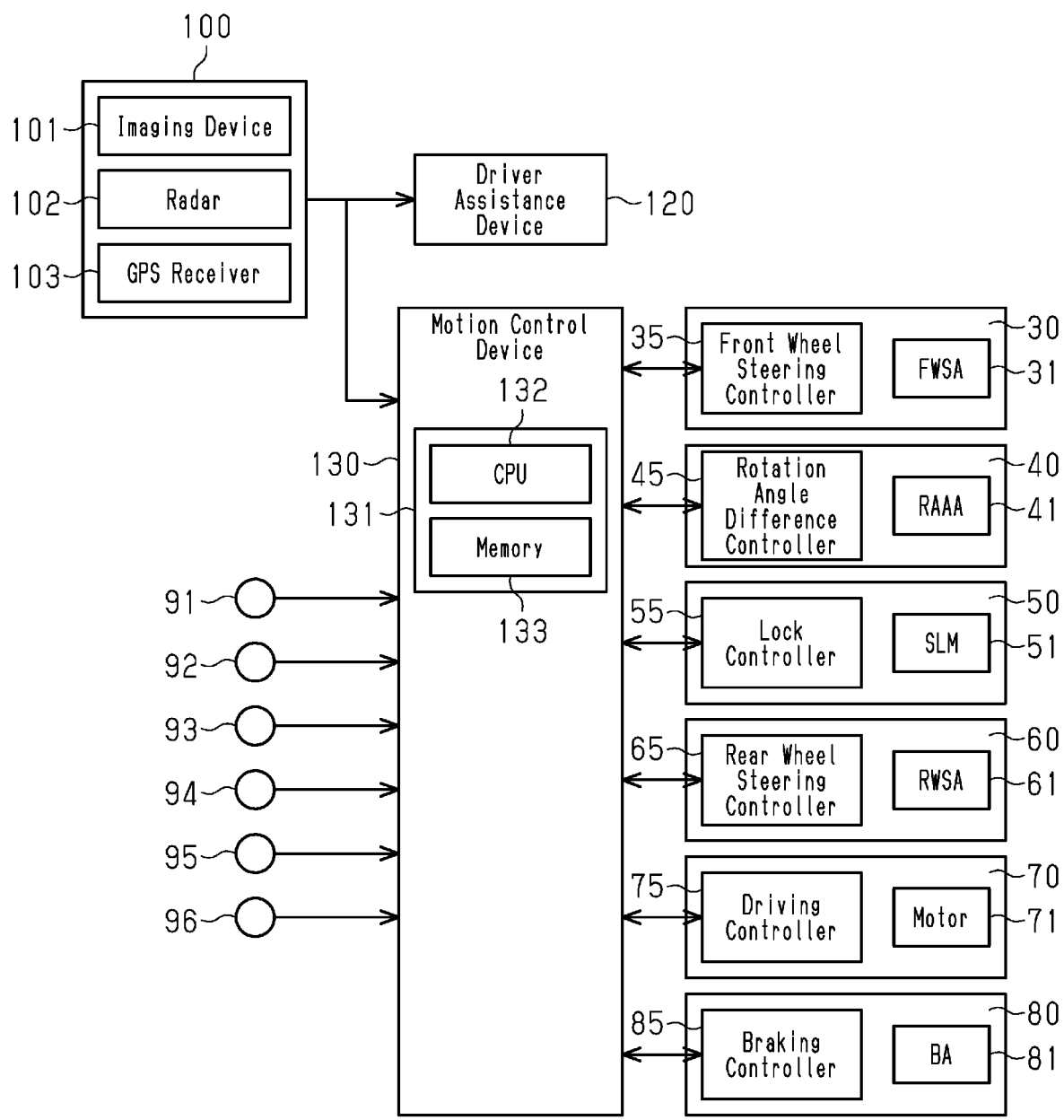
FIG. 2 is a block diagram showing the motion control device for the vehicle of FIG. 1.

As shown in FIGS. 1 and 2, the vehicle 10 includes a front wheel steering device 30, a rotation angle difference adjustment device 40, a steering lock device 50, a rear wheel steering device 60, a driving device 70, and a braking device 80.

The front wheel steering device 30 includes a front wheel steering actuator (FWSA) 31 and a front wheel steering controller 35 that controls the front wheel steering actuator 31. The front wheel steering controller 35 includes, for example, an electronic control device. The front wheel steering actuator 31 includes an electric motor 32 and a front wheel transmission mechanism 33. The electric motor 32 includes a driving shaft coupled to the front wheel steering shaft 12 by the front wheel transmission mechanism 33. The front wheel transmission mechanism 33 converts a rotational motion of the driving shaft of the electric motor 32 into a linear motion of the front wheel steering shaft 12. Thus, when the electric motor 32 is driven by the front wheel steering controller 35, the front wheel steering shaft 12 moves straight. That is, the front wheel steering controller 35 adjusts the steered angle of each front wheel 18F by activating the front wheel steering actuator 31.

The rotation angle difference adjustment device 40 includes a rotation angle adjustment actuator (RAAA) 41 and a rotation angle difference controller 45 that controls the rotation angle adjustment actuator 41. The rotation angle difference controller 45 includes, for example, an electronic control device. The rotation angle adjustment actuator 41 includes an input shaft 42 that rotates integrally with the steering wheel 11, and an output shaft 43 that rotates as the front wheel steering shaft 12 moves straight. The rotation angle adjustment actuator 41 is activated in order to adjust a rotation angle difference Δθ, which is the difference between the rotation angle of the input shaft 42 and the rotation angle of the output shaft 43. In a state in which the rotation angle adjustment actuator 41 is deactivated, the rotation angle difference 40 is maintained.

The output shaft 43 includes pinion teeth 43a. The front wheel steering shaft 12 includes rack teeth 12a respectively meshing with the pinion teeth 43a. Thus, the front wheel steering shaft 12 operates as the output shaft 43 rotates. That is, when the rotation angle of the input shaft 42 is maintained, the rotation angle difference controller 45 adjusts the steered angle of each front wheel 18F by changing the rotation angle difference 40 through activation of the rotation angle adjustment actuator 41.

The steering lock device 50 includes a steering lock mechanism (SLM) 51 and a lock controller 55 that controls the steering lock mechanism 51. The lock controller 55 includes, for example, an electronic control device. The steering lock mechanism 51 is selectively switched between an inactive state that permits the steering wheel 11 to rotate and an active state that prohibits the steering wheel 11 from rotating. When the lock controller 55 performs control, the state of the steering lock mechanism 51 is switched from one of the inactive state and the active state to the other. When the state of the steering lock mechanism 51 enters the active state so that the rotation of the steering wheel 11 is restricted, the rotation angle of the input shaft 42 is maintained. The configuration of the steering lock mechanism 51 is known, and thus will not be described in detail.

The rear wheel steering device 60 includes a rear wheel steering actuator (RWSA) 61 and a rear wheel steering controller 65 that controls the rear wheel steering actuator 61. The rear wheel steering controller 65 includes, for example, an electronic control device. The rear wheel steering actuator 61 includes an electric motor 62 and a rear wheel transmission mechanism 63. The electric motor 62 includes a driving shaft coupled to the rear wheel steering shaft 15 by the rear wheel transmission mechanism 63. The rear wheel transmission mechanism 63 converts a rotational motion of the driving shaft of the electric motor 62 into a linear motion of the rear wheel steering shaft 15. Thus, when the electric motor 62 is driven by the rear wheel steering controller 65, the rear wheel steering shaft 15 moves straight. That is, the rear wheel steering controller 65 adjusts the steered angle of each rear wheel 18R by activating the rear wheel steering actuator 61.

The driving device 70 includes a traveling motor 71 that is a power source of the vehicle 10 and a driving controller 75 that controls the traveling motor 71. The driving controller 75 includes, for example, an electronic control device. In the example shown in FIG. 1, the vehicle 10 is a front-wheel drive vehicle. In this case, the driving force output from the traveling motor 71 is transmitted to the two front wheels 18F, whereas the driving force is not transmitted to the two rear wheels 18R.

The braking device 80 includes a braking actuator 81 and a braking controller 85 that controls the braking actuator 81. The braking controller 85 includes, for example, an electronic control device. The braking actuator 81 is configured to individually adjust the braking forces applied to the wheels 18F and 18R. The configuration of the braking actuator 81 is known, and thus will not be described in detail.

The force used to adjust a longitudinal acceleration of the vehicle 10 is hereinafter referred to as a longitudinal force. When the vehicle 10 is accelerated, the longitudinal force has a positive value. When the vehicle 10 is decelerated, the longitudinal force has a negative value. The driving force transmitted to the wheels by the driving of the power source of the vehicle 10 and the braking force applied to the wheels by the activation of the braking actuator 81 correspond to the longitudinal force. Thus, the braking actuator 81 and the traveling motor 71 correspond to a longitudinal force adjustment actuator that adjusts the longitudinal forces of the wheels 18F, 18R.

Detection System of Vehicle

The detection system of the vehicle 10 includes multiple types of sensors that detect a vehicle state quantity indicating the state of the vehicle 10. Examples of such sensors in the vehicle 10 include a vehicle speed sensor 91, a longitudinal acceleration sensor 92, a lateral acceleration sensor 93, a yaw rate sensor 94, an output shaft sensor 95, and a steering angle sensor 96. The vehicle speed sensor 91 detects a vehicle speed V, which is the travel speed of the vehicle 10. The longitudinal acceleration sensor 92 detects a longitudinal acceleration Gx of the vehicle 10. The lateral acceleration sensor 93 detects a lateral acceleration Gy of the vehicle 10. The yaw rate sensor 94 detects a yaw rate Yr of the vehicle 10. The output shaft sensor 95 detects a rotation angle θu of the output shaft 43. The steering angle sensor 96 detects a steering angle θh of the steering wheel 11.

The detection system of the vehicle 10 includes a monitoring apparatus 100 that monitors the surroundings of the vehicle 10. The monitoring apparatus 100 includes an imaging device 101, a radar 102, and a GPS receiver 103. The imaging device 101 captures the surroundings of the vehicle 10. The radar 102 detects, for example, the distance between the vehicle 10 and another vehicle, a distance from the vehicle 10 to an obstacle, and a distance from the vehicle 10 to a pedestrian. The GPS receiver 103 obtains the position of the vehicle 10.

Control System of Vehicle

As shown in FIG. 2, the control system of the vehicle 10 includes a motion control device 130 of the present embodiment and a driver assistance device 120.

Driver Assistance Device

The driver assistance device 120 is an electronic control device. For example, the driver assistance device 120 includes a CPU and a memory. In this case, a control program executed by the CPU is stored in the memory.

When the CPU executes the control program, the driver assistance device 120 functions as multiple types of application request units. The application request unit is a functional unit that enables a driving assistance function to assist the driving of the vehicle 10 by the driver. The application request unit sends a request value used to enable the driving assistance function to the motion control device 130.

The driving assistance function includes a function of causing the vehicle 10 to turn automatically. Examples of the driving assistance function for causing the vehicle 10 to turn automatically include lane-keeping assist and self-driving. When the application request unit requests the vehicle 10 to turn, the request value output by the application request unit includes a request value XR of the state quantity of the vehicle 10 representing the turning state of the vehicle 10. The state quantity of the vehicle 10 representing the turning state of the vehicle 10 is, for example, a yaw rate or a lateral acceleration. The request value XR of the state quantity is a request value of the yaw rate or a request value of the lateral acceleration. The request value XR of the state quantity of the vehicle 10 representing the turning state of the vehicle 10 is hereinafter referred to as a turning state quantity request value XR.

To cause the vehicle 10 to automatically turn, the driver assistance device 120 obtains the motion amount request value MR based on information received from the monitoring apparatus 100 and sends the obtained motion amount request value MR to the motion control device 130.

Motion Control Device

The motion control device 130 communicates with other vehicle on-board control devices; namely, the driver assistance device 120, the front wheel steering controller 35, the rotation angle difference controller 45, the lock controller 55, the rear wheel steering controller 65, the driving controller 75, and the braking controller 85.

The motion control device 130 receives various types of information from the monitoring apparatus 100 and receives detection signals of the various sensors 91 to 96. The motion control device 130 commands multiple actuators to be activated based on the turning state quantity request value XR sent from the driver assistance device 120, the information received from the monitoring apparatus 100, the detection signals of the various sensors 91 to 96, and the information obtained from the controllers (control circuits) 35, 45, 55, 65, 75, 85.

The motion control device 130 includes processing circuitry 131. The processing circuitry 131 includes a CPU 132 and a memory 133. The memory 133 stores control programs. One of the control programs is a motion control program used to turn the vehicle 10 by activating an actuator related to turning of the vehicle 10. The CPU 132 executes these control programs. In this respect, the CPU 132 corresponds to an execution device.

Figure 3:
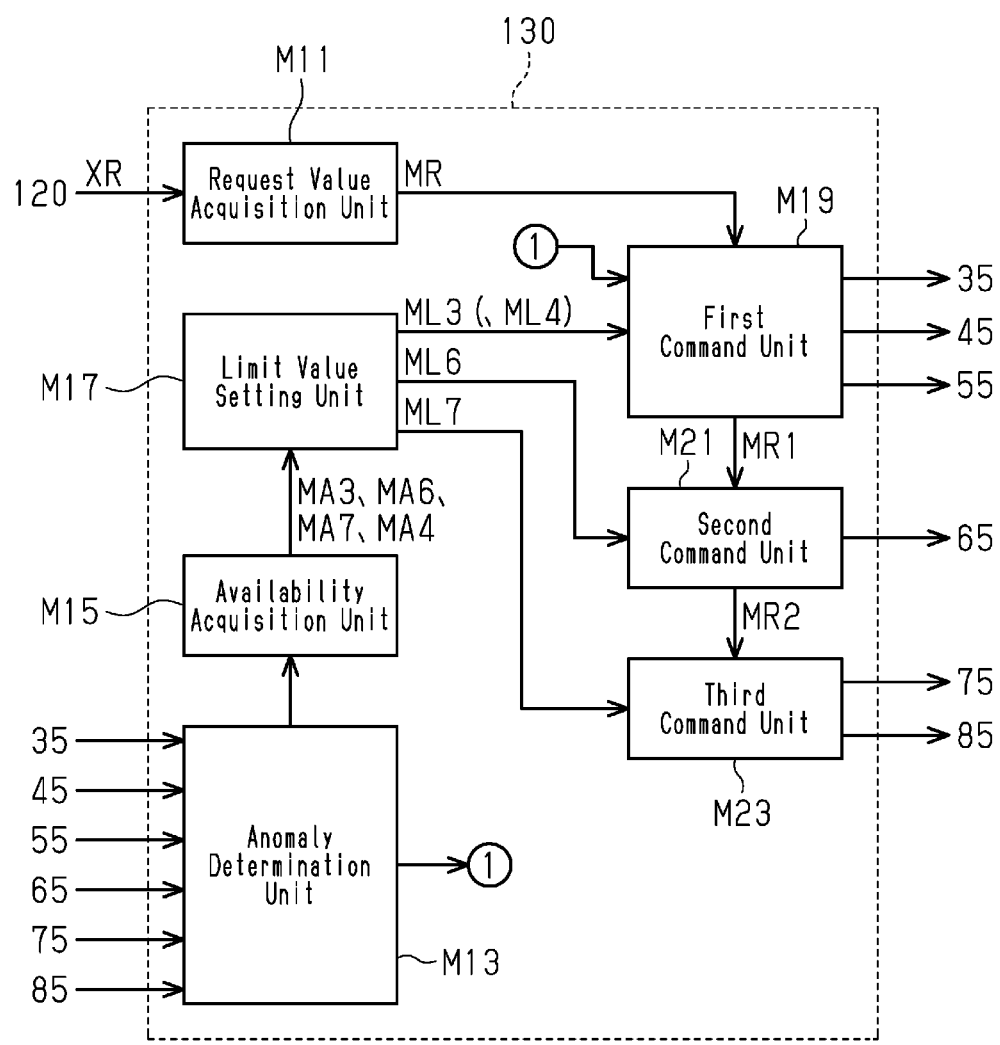
FIG. 3 is a block diagram showing the functional configuration of the motion control device of FIG. 2.

Referring to FIG. 3, the CPU 132 executes the control programs stored in the memory 133 so that the CPU 132 functions as a request value acquisition unit M11, an anomaly determination unit M13, an availability acquisition unit M15, and a limit value setting unit M17. Further, the CPU 132 functions as a first command unit M19, a second command unit M21, and a third command unit M23.

The request value acquisition unit M11 obtains a motion amount request MR based on the turning state quantity request value XR sent by the driver assistance device 120. The motion amount request value MR is a request value of the motion amount used to turn the vehicle 10. The motion amount of the vehicle 10 for turning the vehicle 10 is, for example, a yaw moment. In the present embodiment, when the turning state quantity request value XR is a yaw rate, the request value acquisition unit M11 obtains the motion amount request value MR based on the turning state quantity request value XR and a calculation value obtained through feedback control using the deviation between the motion amount request value MR and the yaw rate Yr as an input. When the turning state quantity request value XR is a lateral acceleration, the request value acquisition unit M11 obtains the motion amount request value MR based on the turning state quantity request value XR and a calculation value obtained through feedback control using the deviation between the turning state quantity request value XR and the lateral acceleration Gy as an input.

The anomaly determination unit M13 determines, for each of the actuators, whether an anomaly has occurred in the actuator. When receiving information indicating that an anomaly has occurred in an actuator from the controller used for that actuator, the anomaly determination unit M13 determines that an anomaly has occurred in the actuator. For example, when receiving information indicating that an anomaly has occurred in the front wheel steering actuator 31 from the front wheel steering controller 35, the anomaly determination unit M13 determines that an anomaly has occurred in the front wheel steering actuator 31.

When the anomaly determination unit M13 is unable to communicate with a controller, the anomaly determination unit M13 may determine that an anomaly has occurred in the actuator corresponding to that controller. For example, when the anomaly determination unit M13 is unable to communicate with the front wheel steering controller 35, the anomaly determination unit M13 may determine that an anomaly has occurred in the front wheel steering actuator 31.

In such a manner, the anomaly determination unit M13 recognizes the states of the front wheel steering actuator 31, the rear wheel steering actuator 61, the rotation angle adjustment actuator 41, the steering lock mechanism 51, the traveling motor 71, and the braking actuator 81. The state of each actuator indicates whether an anomaly has occurred in the actuator.

The availability acquisition unit M15 obtains, as availability MA3 of the front wheel steering actuator 31, a range that enables the front wheel steering actuator 31 to be activated. The availability acquisition unit M15 obtains, as availability MA4 of the rotation angle adjustment actuator 41, a range that enables the rotation angle adjustment actuator 41 to be activated. The availability acquisition unit M15 obtains, as availability MA6 of the rear wheel steering actuator 61, a range that enables the rear wheel steering actuator 61 to be activated. The availability acquisition unit M15 obtains, as availability MA7 of the longitudinal force adjustment actuator, a range that enables the longitudinal force adjustment actuator to be activated.

The availability acquisition unit M15 obtains the availability of each actuator based on a specified value of the upper limit of an activation amount of the actuator, the active state of the actuator at the moment, and the determination result of the anomaly determination unit M13. Of an activation amount of the actuator, a changed speed of the activation amount, and a changed acceleration of the activation amount, the active state of the actuator includes at least the activation amount. Based on the active state of the actuator at the moment, the availability acquisition unit M15 estimates an activation amount predicted value, which is an activation amount that can be reached after a predetermined time. The availability acquisition unit M15 selects the smaller one of the estimated activation amount predicted value and the specified value of the upper limit of the activation amount of the actuator. The availability acquisition unit M15 obtains, as the availability, a larger value as the selected value becomes larger. When it is determined that an anomaly has occurred in an actuator, the availability acquisition unit M15 obtains zero as the availability of the actuator. Thus, the availability acquisition unit M15 obtains the availability MA3 of the front wheel steering actuator 31, the availability MA4 of the rotation angle adjustment actuator 41, and the availability MA6 of the rear wheel steering actuator 61.

When obtaining the availability MA4 of the rotation angle adjustment actuator 41, the availability acquisition unit M15 obtains the availability MA4 by taking into account whether an anomaly has occurred in the steering lock mechanism 51. That is, when it is determined that an anomaly has occurred in the steering lock mechanism 51, the availability acquisition unit M15 obtains zero as the availability MA4 even when it is determined that no anomaly has occurred in the rotation angle adjustment actuator 41. This is because when the rotation angle of the input shaft 42 cannot be maintained, the steered angle of each front wheel 18F remains unchanged even if the rotation angle difference 40 is changed by activating the rotation angle adjustment actuator 41.

In the present embodiment, the traveling motor 71 and the braking actuator 81 correspond to the longitudinal force adjustment actuator as described above. Thus, the availability acquisition unit M15 obtains the availability of the traveling motor 71 and the availability of the braking actuator 81, and obtains the availability MA7 of the longitudinal force adjustment actuator based on them. When the anomaly determination unit M13 determines that an anomaly has occurred in at least one of the traveling motor 71 and the braking actuator 81, the availability acquisition unit M15 obtains zero as the availability MA7.

The limit value setting unit M17 sets a first motion amount limit value ML3 in accordance with the availability MA3 of the front wheel steering actuator 31. The first motion amount is the above motion amount (a yaw moment in the present embodiment) that can be achieved by activating the front wheel steering actuator 31. Thus, the first motion amount limit value ML3 is the upper limit of the first motion amount at the moment that can be estimated from the availability MA3. The limit value setting unit M17 sets the first motion amount limit value ML3 to be larger as the availability MA3 becomes larger. In this case, the limit value setting unit M17 sets the first motion amount limit value ML3 by taking the vehicle speed V into account.

The limit value setting unit M17 sets a second motion amount limit value ML6 in accordance with the availability MA6 of the rear wheel steering actuator 61. The second motion amount is the above motion amount that can be achieved by activating the rear wheel steering actuator 61. Thus, the second motion amount limit value ML6 is the upper limit of the first motion amount at the moment that can be estimated from the availability MA6. The limit value setting unit M17 sets the second motion amount limit value ML6 to be larger as the availability MA6 becomes larger. In this case, the limit value setting unit M17 sets the second motion amount limit value ML6 by taking the vehicle speed V into account.

The limit value setting unit M17 sets a third motion amount limit value ML7 in accordance with the availability MA7 of the longitudinal force adjustment actuator. The third motion amount is the above motion amount that can be achieved by activating the longitudinal force adjustment actuator: that is, the traveling motor 71 and the braking actuator 81. Thus, the third motion amount limit value ML7 is the upper limit of the first motion amount at the moment that can be estimated from the availability MA7. The limit value setting unit M17 sets the third motion amount limit value ML7 to be larger as the availability MA7 becomes larger. In this case, the limit value setting unit M17 sets the third motion amount limit value ML7 by taking the vehicle speed V into account.

The limit value setting unit M17 sets a fourth motion amount limit value ML4 in accordance with the availability MA4 of the rotation angle adjustment actuator 41. The fourth motion amount is the above motion amount that can be achieved by activating the rotation angle adjustment actuator 41. Thus, the fourth motion amount limit value ML4 is the upper limit of the fourth motion amount at the moment that can be estimated from the availability MA4. The limit value setting unit M17 sets the fourth motion amount limit value ML4 to be larger as the availability MA4 becomes larger. In this case, the limit value setting unit M17 sets the fourth motion amount limit value ML4 by taking the vehicle speed V into account.

In the present embodiment, when it is determined that no anomaly has occurred in the front wheel steering actuator 31, the limit value setting unit M17 does not set the fourth motion amount limit value ML4. When it is determined that an anomaly has occurred in the front wheel steering actuator 31, the limit value setting unit M17 sets the fourth motion amount limit value ML4. This is because the rotation angle adjustment actuator 41 is set so as not to be activated in a case in which no anomaly has occurred in the front wheel steering actuator 31 and the steered angle of the front wheel 18F can be adjusted by the front wheel steering actuator 31.

The limit value setting unit M17 sets the motion amount limit value for an actuator in which an anomaly has occurred to zero. For example, when it is determined that an anomaly has occurred in the front wheel steering actuator 31, the limit value setting unit M17 sets the first motion amount limit value ML3 to zero. Further, for example, when it is determined that an anomaly has occurred in the rear wheel steering actuator 61, the limit value setting unit M17 sets the second motion amount limit value ML6 to zero.

The first command unit M19 obtains a first motion amount command value MC3. That is, when it is determined that no anomaly has occurred in the front wheel steering actuator 31, the first command unit M19 obtains, as the first motion amount command value MC3, a value corresponding to the smaller one of the motion amount request value MR and the first motion amount limit value ML3. For example, the first command unit M19 obtains, as the first motion amount command value MC3, the smaller one of the motion amount request value MR and the first motion amount limit value ML3. The first command unit M19 commands the front wheel steering actuator 31 to be activated based on the first motion amount command value MC3. That is, the first command unit M19 sends the first motion amount command value MC3 to the front wheel steering controller 35. In this manner, the first command unit M19 causes the front wheel steering actuator 31 to be activated based on the first motion amount command value MC3.

When it is determined that an anomaly has occurred in the front wheel steering actuator 31, the first command unit M19 obtains, as the first motion amount command value MC3, a value corresponding to the smaller one of the motion amount request value MR and the fourth motion amount limit value ML4. For example, the first command unit M19 obtains, as the first motion amount command value MC3, the smaller one of the motion amount request value MR and the fourth motion amount limit value ML4. The first command unit M19 commands the rotation angle adjustment actuator 41 to be activated based on the first motion amount command value MC3 and commands the state of the steering lock mechanism 51 to be set to the active state. That is, the first command unit M19 sends the first motion amount command value MC3 to the rotation angle difference controller 45 and sends a command that sets the state of the steering lock mechanism 51 to the active state to the lock controller 55. In this manner, the first command unit M19 activates the rotation angle adjustment actuator 41 based on the first motion amount command value MC3 and sets the state of the steering lock mechanism 51 to the active state.

An anomaly may occur in both of the front wheel steering actuator 31 and the rotation angle adjustment actuator 41. In this case, the vehicle 10 is turned by activating the rear wheel steering actuator 61 or the longitudinal force adjustment actuator. When the steered angle of the front wheel 18F is not adjustable in this manner, the first command unit M19 may send a command to the lock controller 55 to set the state of the steering lock mechanism 51 to the active state. That is, the first command unit M19 sets the state of the steering lock mechanism 51 to the actuated state.

The second command unit M21 obtains, as a second motion amount command value MC6, a value corresponding to the smaller one of the second motion amount limit value ML6 and a first remaining request value MR1 obtained by subtracting the first motion amount command value MC3 from the motion amount request value MR. For example, the second command unit M21 obtains, as the second motion amount command value MC6, the smaller one of the first remaining request value MR1 and the second motion amount limit value ML6. The second command unit M21 commands the rear wheel steering actuator 61 to be activated based on the second motion amount command value MC6. That is, the second command unit M21 sends the second motion amount command value MC6 to the rear wheel steering controller 65. In this manner, the second command unit M21 causes the rear wheel steering actuator 61 to be activated based on the second motion amount command value MC6.

The third command unit M23 obtains, as a third motion amount command value MC7, a value corresponding to the smaller one of the third motion amount limit value ML7 and a second remaining request value MR2 obtained by subtracting the second motion amount command value MC6 from the first remaining request value MR1. For example, the third command unit M23 obtains, as the third motion amount command value MC7, the smaller one of the second remaining request value MR2 and the third motion amount limit value ML7. The third command unit M23 commands the longitudinal force adjustment actuator to be activated based on the third motion amount command value MC7. That is, the third command unit M23 sends a command corresponding to the third motion amount command value MC7 to the driving controller 75 and the braking controller 85. The driving controller 75 and the braking controller 85 correspond to a controller or a control circuit for the longitudinal force adjustment actuator. In this manner, the third command unit M23 causes the longitudinal force adjustment actuator to be activated based on the third motion amount command value MC7.

Turning Control of Vehicle

Figure 4:
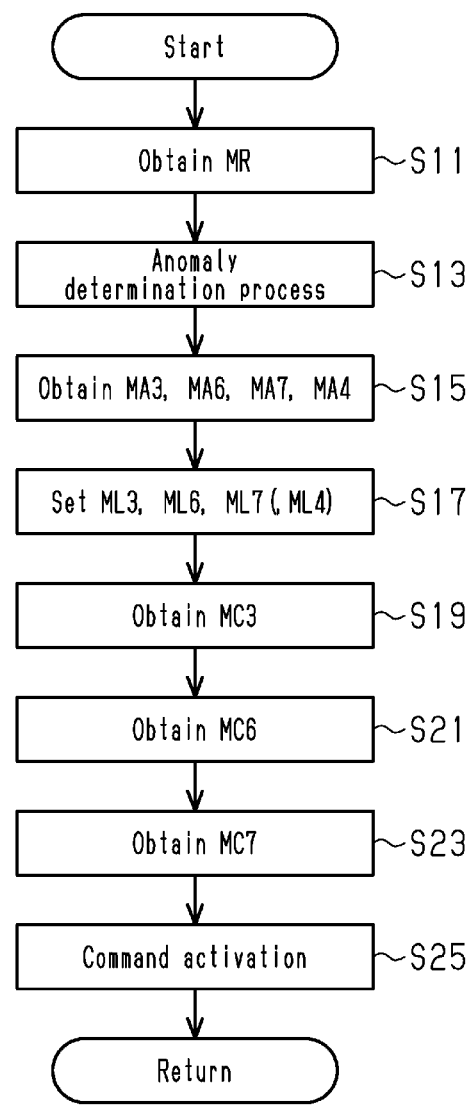
FIG. 4 is a flowchart illustrating a processing routine executed by the motion control device shown in FIG. 3.

A processing routine executed by the CPU 132 to cause the vehicle 10 to turn automatically will now be described with reference to FIG. 4. The processing routine illustrated in FIG. 4 is executed by the CPU 132 executing the motion control program in a predetermined control cycle.

In step S11 of the processing routine, the CPU 132 functions as the request value acquisition unit M11 so as to obtain the motion amount request value MR. That is, the CPU 132 obtains, as the motion amount request value MR, a value obtained based on the latest value of the turning state quantity request value XR sent by the driver assistance device 120 and the latest value of the detection value of a sensor. In the present embodiment, step S11 corresponds to a request value acquisition process.

In step S13, the CPU 132 functions as the anomaly determination unit M13 so as to determine whether an anomaly has occurred in the actuators. This determination is made for each actuator. The process of step S13 is referred to as an anomaly determination process.

In step S15, the CPU 132 functions as the availability acquisition unit M15 so as to obtain the availability MA3 of the front wheel steering actuator 31, the availability MA6 of the rear wheel steering actuator 61, and the availability MA7 of the longitudinal force adjustment actuator. The CPU 132 further obtains the availability MA4 of the rotation angle adjustment actuator 41. The process of step S15 is referred to as an availability acquisition process.

In step S17, the CPU 132 functions as the limit value setting unit M17 so as to set the first motion amount limit value ML3, the second motion amount limit value ML6, the third motion amount limit value ML7, and the fourth motion amount limit value ML4. When it is determined that no anomaly has occurred in the front wheel steering actuator 31, the CPU 132 does not set the fourth motion amount limit value ML4. In this case, the CPU 132 sets the fourth motion amount limit value ML4 to zero. In the present embodiment, step S17 corresponds to a limit value setting process.

In step S19, the CPU 132 functions as the first command unit M19 so as to obtain the first motion amount command value MC3. When it is determined that no anomaly has occurred in the front wheel steering actuator 31, the CPU 132 obtains the first motion amount command value MC3 as a command value for the front wheel steering actuator 31. When it is determined that an anomaly has not occurred in the front wheel steering actuator 31 and it is determined that no anomaly has occurred in the rotation angle adjustment actuator 41 and the steering lock mechanism 51, the CPU 132 obtains the first motion amount command value MC3 as a command value for the rotation angle adjustment actuator 41. In the present embodiment, step S19 corresponds to a first command value acquisition process.

In step S21, the CPU 132 functions as the second command unit M21 so as to obtain the second motion amount command value MC6 as a command value for the rear wheel steering actuator 61. When the first motion amount command value MC3 is equal to the motion amount request value MR, the CPU 132 obtains zero as the second motion amount command value MC6. In the present embodiment, step S21 corresponds to a second command value acquisition process.

In step S23, the CPU 132 functions as the third command unit M23 so as to obtain the third motion amount command value MC7 as a command value for the longitudinal force adjustment actuator. When the sum of the first motion amount command value MC3 and the second motion amount command value MC6 is equal to the motion amount request value MR, the CPU 132 obtains zero as the third motion amount command value MC7. In the present embodiment, step S23 corresponds to a third command value acquisition process.

In step S25, the CPU 132 commands an actuator to be activated. That is, when it is determined that no anomaly has occurred in the front wheel steering actuator 31, the CPU 132 functions as the first command unit M19 so as to command the front wheel steering controller 35 to activate the front wheel steering actuator 31 based on the first motion amount command value MC3. When it is determined that an anomaly has occurred in the front wheel steering actuator 31, the CPU 132 functions as the first command unit M19 so as to command the rotation angle difference controller 45 to activate the rotation angle adjustment actuator 41 based on the first motion amount command value MC3 and command the lock controller 55 to set the state of the steering lock mechanism 51 to the active state. Further, the CPU 132 functions as the second command unit M21 so as to command the rear wheel steering controller 65 to activate the rear wheel steering actuator 61 based on the second motion amount command value MC6. Furthermore, the CPU 132 functions as the third command unit M23 so as to command the driving controller 75 and the braking controller 85 to activate the traveling motor 71 and the braking actuator 81 based on the third motion amount command value MC7. In the present embodiment, step S25 corresponds to a command process. Then, the CPU 132 temporarily ends the processing routine.

Operation and Advantage of Present Embodiment

The operation and advantages of causing the vehicle 10 to turn will now be described with reference to FIGS. 5, 6, 7, and 8.

Figure 5:
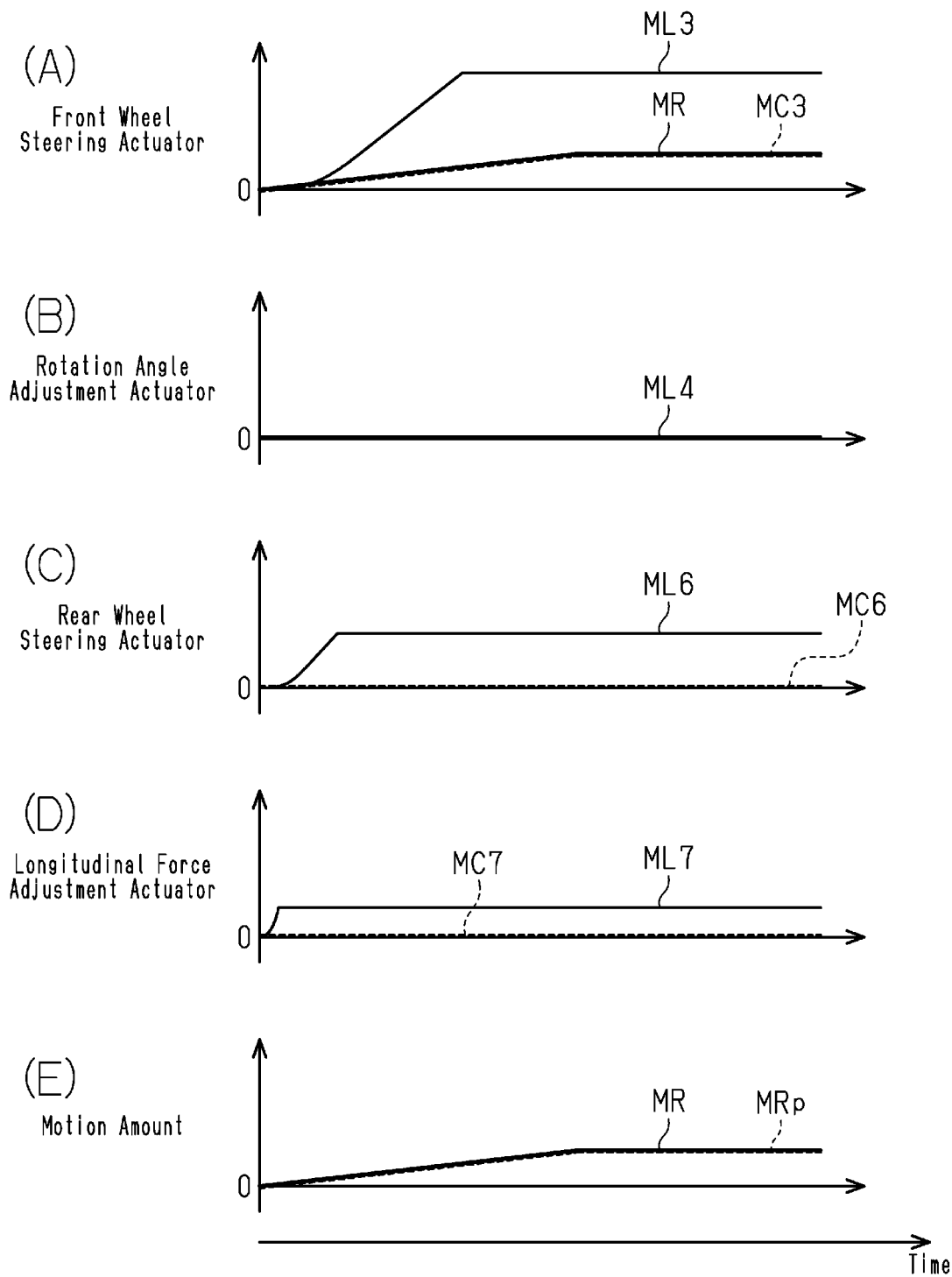
FIG. 5 is a timing diagram showing operation of the vehicle when turned gently.

(A1) The example shown in FIG. 5 will now be described.

In this example, the vehicle 10 is turned gently in a state in which no anomaly occurs in any of the actuators related to turning. The thick solid lines in sections (A) and (E) in FIG. 5 indicate changes in the motion amount request value MR.

In this example, as shown in section (A) of FIG. 5, the first motion amount limit value ML3 does not fall below the motion amount request value MR. That is, the same value as the motion amount request value MR is obtained as the first motion amount command value MC3. When the first motion amount command value MC3 is sent from the motion control device 130 to the front wheel steering controller 35, the front wheel steering controller 35 activates the front wheel steering actuator 31 based on the first motion amount command value MC3. Such activation of the front wheel steering actuator 31 causes a motion amount actual value MRp, which is an actual motion amount of the vehicle 10, to change in the same manner as the motion amount request value MR as shown in section (E) of FIG. 5. The motion amount request value MR corresponds to the turning state quantity request value XR, which is obtained by the driver assistance device 120. Accordingly, the activation of the front wheel steering actuator 31 allows the vehicle 10 to be turned in accordance with a request from the driver assistance device 120.

In this example, no anomaly has occurred in the front wheel steering actuator 31. Thus, as shown in section (B) of FIG. 5, the fourth motion amount limit value ML4, which is a limit value for the rotation angle adjustment actuator 41, is set to zero. Further, the adjustment of the steered angle of each front wheel 18F allows the vehicle 10 to be turned in accordance with a request from the driver assistance device 120. Thus, as shown in sections (C) and (D) of FIG. 5, the second motion amount command value MC6, which is a command value for the rear wheel steering actuator 61, and the third motion amount command value MC7, which is a command value for the longitudinal force adjustment actuator, are set to zero.

(A2) The example shown in FIG. 6 will now be described.

In this example, the vehicle 10 is turned quickly although no anomaly occurs in any of the actuators related to turning. In this case, the thick solid lines in sections (A) and (E) in FIG. 6 each indicate that the motion amount request value MR increases at a relatively high speed.

In this example, no anomaly has occurred in the front wheel steering actuator 31. Thus, referring to sections (A) and (B) of FIG. 6, the motion control device 130 sends the first motion amount command value MC3 to the front wheel steering controller 35 and does not send the first motion amount command value MC3 to the rotation angle difference controller 45. Thus, the steered angle of each front wheel 18F is adjusted by the front wheel steering actuator 31.

Figure 6:
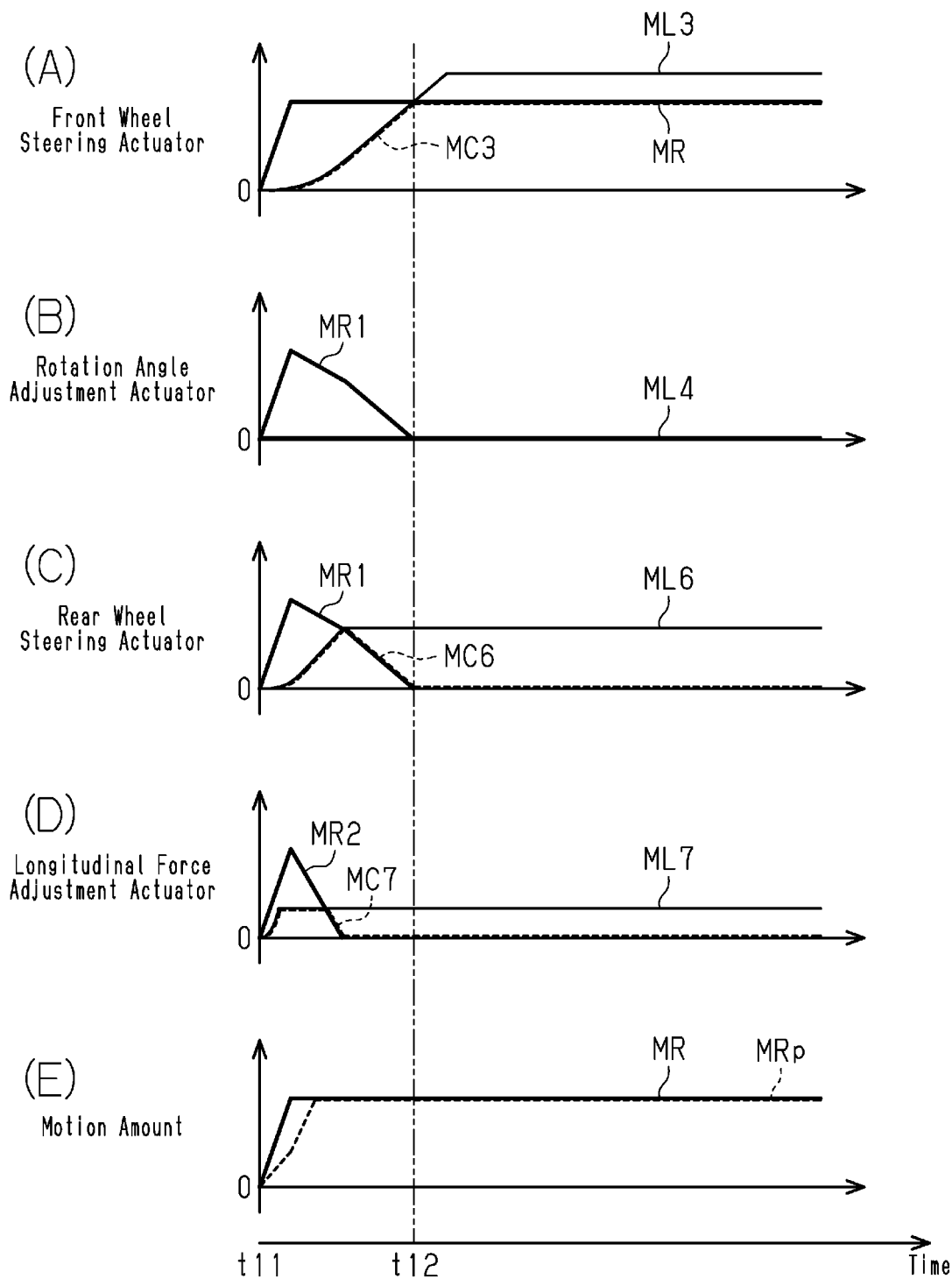
FIG. 6 is a timing diagram showing operation of the vehicle when turned quickly.

As shown in section (A) of FIG. 6, the first motion amount limit value ML3 is lower than the motion amount request value MR during a period from time t11 to time t12. In this case, the same value as the first motion amount limit value ML3 is obtained as the first motion amount command value MC3. That is, the first motion amount command value MC3 is lower than the motion amount request value MR during the period. Thus, the vehicle 10 cannot be turned in accordance with a request from the driver assistance device 120 only by adjusting the steered angle of the front wheel 18F using the front wheel steering actuator 31.

In the present embodiment, the value obtained by subtracting the first motion amount limit value ML3 from the motion amount request value MR is obtained as the first remaining request value MR1. During the period from time t11 to time t12, since the first motion amount limit value ML3 is lower than the motion amount request value MR as described above, the first remaining request value MR1 is set to a value different from zero as shown in sections (B) and (C) of FIG. 6. As a result, the smaller one of the first remaining request value MR1 and the second motion amount limit value ML6 is obtained as the second motion amount command value MC6. Since the second motion amount command value MC6 is sent from the motion control device 130 to the rear wheel steering controller 65, the rear wheel steering controller 65 activates the rear wheel steering actuator 61 based on the second motion amount command value MC6. That is, the steered angle of each rear wheel 18R is adjusted in accordance with the second motion amount command value MC6.

In this example, the vehicle 10 cannot be turned in accordance with the motion amount request value MR only by activating the front wheel steering actuator 31 and the rear wheel steering actuator 61. That is, since the second motion amount command value MC6 is lower than the first remaining request value MR1 as shown in section (C) of FIG. 6, the second remaining request value MR2 is set to a value different from zero as shown in section (D) of FIG. 6. That is, the value obtained by subtracting the second motion amount command value MC6 from the first remaining request value MR1 is obtained as the second remaining request value MR2. As a result, the smaller one of the second remaining request value MR2 and the third motion amount limit value ML7 is obtained as the third motion amount command value MC7. This causes a command corresponding to the third motion amount command value MC7 to be sent from the motion control device 130 to the driving controller 75 and the braking controller 85. Thus, based on the command, the driving controller 75 activates the traveling motor 71 and the braking controller 85 activates the braking actuator 81. That is, the difference in longitudinal force between the front wheels 18F on the inside and outside of a turn is adjusted.

In a period during which the first motion amount limit value ML3 is lower than the motion amount request value MR, the front wheel steering actuator 31 adjusts the steered angle of each front wheel 18F. Further, in the same period, the rear wheel steering actuator 61 adjusts the steered angle of each rear wheel 18R, and the longitudinal force adjustment actuator adjusts the difference in longitudinal force between the two front wheels 18F. Accordingly, even in a case in which the driver assistance device 120 requests the vehicle 10 to turn quickly during self-driving, the vehicle 10 behaves in a manner closer to that of the request from the driver assistance device 120 as shown in section (E) of FIG. 6.

Subsequent to time t12, the first motion amount limit value ML3 is greater than the motion amount request value MR. Thus, the second motion amount command value MC6 and the third motion amount command value MC7 are set to zero. This allows the vehicle 10 to be turned in accordance with a request from the driver assistance device 120 by adjusting the steered angle of each front wheel 18F using the front wheel steering actuator 31.

(A3) The example shown in FIG. 7 will now be described.

In this example, an anomaly has occurred in the front wheel steering actuator 31 although the driver assistance device 120 requests the vehicle 10 to be turned gently. Among the actuators related to turning, no anomaly has occurred in the actuators other than the front wheel steering actuator 31.

Figure 7:
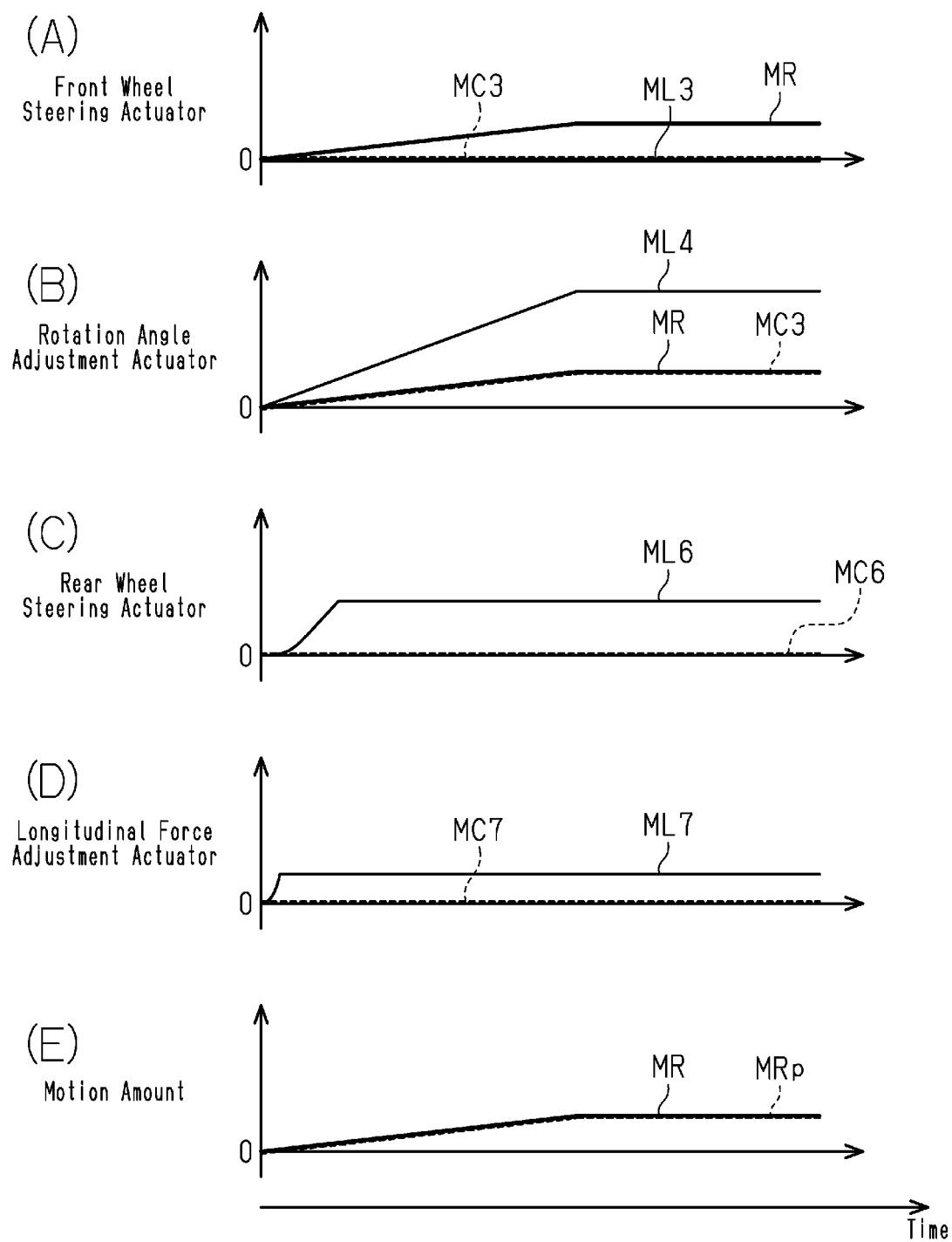
FIG. 7 is a timing diagram showing operation of the vehicle when turned in a state in which an anomaly has occurred in the front wheel steering actuator.

In this example, as shown in section (A) of FIG. 7, since an anomaly has occurred in the front wheel steering actuator 31, the first motion amount limit value ML3 is set to zero. As shown in section (B) of FIG. 7, the fourth motion amount limit value ML4 is set such that the fourth motion amount limit value ML4 does not fall below the motion amount request value MR. That is, the same value as the motion amount request value MR is obtained as the first motion amount command value MC3. Further, a command of setting the state of the steering lock mechanism 51 to the active state is sent from the motion control device 130 to the lock controller 55, and the first motion amount command value MC3 is sent from the motion control device 130 to the rotation angle difference controller 45. As a result, since the steering lock mechanism 51 is set to the active state by the lock controller 55, the steering wheel 11 is restricted from rotating. That is, the rotation angle of the input shaft 42 is maintained. In this state, the rotation angle difference controller 45 activates the rotation angle adjustment actuator 41 based on the first motion amount command value MC3. As a result, the rotation angle adjustment actuator 41 sets the rotation angle difference 40 to a value corresponding to the first motion amount command value MC3. That is, the rotation angle adjustment actuator 41 adjusts the steered angle of each front wheel 18F. This causes the motion amount actual value MRp to change in the same manner as the motion amount request value MR as shown in section (E) of FIG. 7. Accordingly, in this example, activating the rotation angle adjustment actuator 41 allows the vehicle 10 to be turned in accordance with a request from the driver assistance device 120. That is, the vehicle 10 can be turned even when the front wheel steering actuator 31 of the actuators related to turning cannot be activated normally.

In this example, the vehicle 10 is turned in accordance with a request from the driver assistance device 120 by adjusting the steered angle of each front wheel 18F. Thus, as shown in sections (C) and (D) of FIG. 7, the second motion amount command value MC6, which is a command value for the rear wheel steering actuator 61, and the third motion amount command value MC7, which is a command value for the longitudinal force adjustment actuator, are both set to zero.

The vehicle 10 may be unable to be turned in accordance with a request from the driver assistance device 120 only by activating the rotation angle adjustment actuator 41. In this case, the rear wheel steering actuator 61 and the longitudinal force adjustment actuator are activated in addition to the rotation angle adjustment actuator 41. Even in this case, the rear wheel steering actuator 61 is activated with a higher priority than the longitudinal force adjustment actuator.

(A4) The example shown in FIG. 8 will now be described.

In this example, an anomaly has occurred in both of the front wheel steering actuator 31 and the rotation angle adjustment actuator 41 although the driver assistance device 120 requests the vehicle 10 to be turned gently. That is, the front wheel 18F cannot be steered. No anomaly has occurred in the rear wheel steering actuator 61 and the longitudinal force adjustment actuator.

Figure 8:
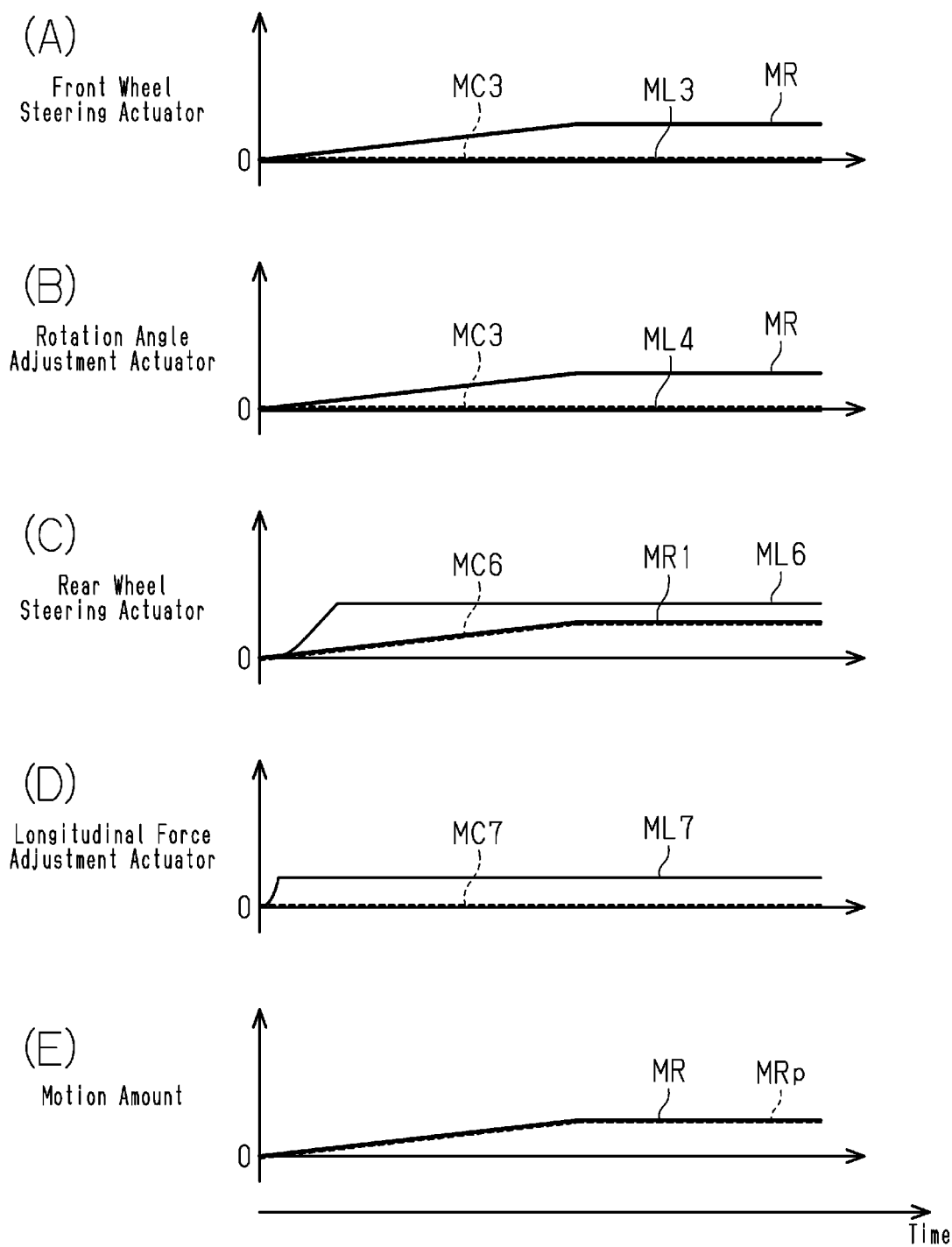
FIG. 8 is a timing diagram showing operation of the vehicle when turned in a state in which the steered angle of each front wheel cannot be adjusted.

In this case, as shown in sections (A) and (B) of FIG. 8, the first motion amount limit value ML3 and the fourth motion amount limit value ML4 are set to zero. Thus, the first motion amount command value MC3 is set to zero. Further, a command of setting the state of the steering lock mechanism 51 to the active state is sent from the motion control device 130 to the steering lock mechanism 51. When the state of the steering lock mechanism 51 enters the active state, the rotation angles of the steering wheel 11 and the input shaft 42 are maintained.

The value obtained by subtracting the first motion amount limit value ML3 from the motion amount request value MR is obtained as the first remaining request value MR1. In this example, the same value as the motion amount request value MR is obtained as the first remaining request value MR1. As shown in section (C) of FIG. 8, the second motion amount limit value ML6 does not fall below the first remaining request value MR1. Thus, the first remaining request value MR1 is set as the second motion amount command value MC6. Since the second motion amount command value MC6 is sent from the motion control device 130 to the rear wheel steering controller 65, the rear wheel steering controller 65 activates the rear wheel steering actuator 61 based on the second motion amount command value MC6. That is, the steered angle of each rear wheel 18R is adjusted in accordance with the second motion amount command value MC6. During such adjustment of the steered angle of the rear wheel 18R, the rotation of the steering wheel 11 (i.e., the steering of the front wheel 18F) is restricted. This allows the vehicle 10 to be easily turned. As a result, the adjustment of the steered angle of the rear wheel 18R causes the motion amount actual value MRp to change in the same manner as the motion amount request value MR as shown in section (E) of FIG. 8. Accordingly, in this example, activating the rear wheel steering actuator 61 allows the vehicle 10 to be turned in accordance with a request from the driver assistance device 120. That is, the vehicle 10 can be turned even when the front wheel steering actuator 31 and the rotation angle adjustment actuator 41 of the actuators related to turning cannot be activated normally.

The vehicle 10 may be unable to be turned in accordance with a request from the driver assistance device 120 only by activating the rear wheel steering actuator 61. In this case, the longitudinal force adjustment actuator is activated in addition to the rear wheel steering actuator 61.

In a case in which an anomaly has occurred in the actuators 31, 41, which adjust the steered angle of each front wheel 18F, the longitudinal force adjustment actuator may be activated with a higher priority than the rear wheel steering actuator 61. In this case, a braking force applied to the front wheel on the inside of a turn in the left and right front wheels 18F is increased so as to differentiate between the longitudinal forces of the left and right front wheels 18F, thereby producing a yaw moment in the vehicle 10. However, the braking force increases in the entire vehicle 10 so that the vehicle 10 is decelerated. In order to limit such deceleration of the vehicle 10, which results from the difference in the longitudinal forces between the left and right front wheels 18F, the driving force of the traveling motor 71 is increased. Nevertheless, this lowers the efficiency of energy in the vehicle 10.

In the present embodiment, the rear wheel steering actuator 61 is activated with a higher priority than the longitudinal force adjustment actuator. This allows the vehicle 10 to be turned in accordance with a request from the motion control device 130 while limiting a decrease in the energy efficiency of the vehicle 10, even in a case in which the steered angle of the front wheel 18F cannot be adjusted or the vehicle 10 cannot be turned in accordance with the request only by adjusting the steered angle of the front wheel 18F.

Modifications

The above embodiment may be modified as follows. The above embodiment and the following modifications can be combined as long as the combined modifications remain technically consistent with each other.

In the above embodiment, the availability of each actuator is obtained by taking into account a determination result as to whether an anomaly has occurred in the actuator. Instead, the availability of each actuator may be obtained without taking into account the determination result as to whether an anomaly has occurred in the actuator. In this case, the determination result as to whether an anomaly has occurred in an actuator is taken into account to set the motion amount limit value for the actuator. That is, the motion amount limit value for an actuator that has been determined as having an anomaly is set to zero.

The motion amount limit value for an actuator that has been determined as having an anomaly does not have to be set to zero. In this case, the motion control device 130 does not command the controller for an actuator that has been determined as having an anomaly to activate the actuator.

The motion control device 130 may be employed in a vehicle without the rotation angle difference adjustment device 40. In this case, when it is determined that an anomaly has occurred in the front wheel steering actuator 31, the rear wheel steering actuator 61 is commanded to be activated. Additionally, the longitudinal force adjustment actuator is commanded to be activated in a case in which the vehicle cannot be turned in accordance with the motion amount request value MR only by activating the rear wheel steering actuator 61.

Even when it is determined that no anomaly has occurred in the rotation angle adjustment actuator 41, the fourth motion amount limit value ML4 for the rotation angle adjustment actuator 41 may be obtained.

In the above embodiment, the motion amount limit value for an actuator that has been determined as having an anomaly is set to zero. Instead, even when an anomaly has occurred in an actuator, an active state value indicating the active state of the actuator is obtainable. If the active state value of an actuator in which an anomaly has occurred is obtainable, it indicates that the activation of the actuator can produce a turning moment. Thus, in a case in which the active state value of an actuator even when an anomaly has occurred in the actuator is obtainable, the motion amount limit value may be set to a value corresponding to the current value of the active state value. The value corresponding to the active state value is a value obtained by converting the active state value into a motion amount. Even in this case, the active state value of an actuator in which an anomaly has occurred is unobtainable, the motion amount limit value is set to zero.

The value obtained by subtracting a predetermined correction amount from the smaller one of the motion amount request value MR and the first motion amount limit value ML3 may be obtained as the first motion amount command value MC3. Even in this case, a value corresponding to the smaller one of the motion amount request value MR and the first motion amount limit value ML3 is obtained as the first motion amount command value MC3.

The value obtained by subtracting a predetermined correction amount from the smaller one of the first remaining request value MR1 and the second motion amount limit value ML6 may be obtained as the second motion amount command value MC6. Even in this case, a value corresponding to the smaller one of the first remaining request value MR1 and the second motion amount limit value ML6 is obtained as the second motion amount command value MC6.

The value obtained by subtracting a predetermined correction amount from the smaller one of the second remaining request value MR2 and the third motion amount limit value ML7 may be obtained as the third motion amount command value MC7. Even in this case, a value corresponding to the smaller one of the second remaining request value MR2 and the third motion amount limit value ML7 is obtained as the third motion amount command value MC7.

In the above embodiment, when the vehicle 10 is turned with the steered angle of each front wheel 18F unadjustable, the lock controller 55 is commanded to set the state of the steering lock mechanism 51 to the active state. That is, when the vehicle 10 is turned with the steered angle of each front wheel 18F unadjustable, the state of the steering lock mechanism 51 does not have to be switched from the inactive state to the active state.

The driving device may include an engine in addition to the traveling motor 71 as a power source of the vehicle. As long as the driving device includes an engine as a power source of the vehicle, the driving device does not have to include the traveling motor 71. In such a case, the engine also corresponds to the longitudinal force adjustment actuator.

The driving device may include a driving motor for each of the wheels 18F, 18R. In this case, a yaw moment is produced in the vehicle by adjusting the difference in driving force between the left and right wheels.

The vehicle may be a rear-wheel drive vehicle or an all-wheel drive vehicle.

The processing circuitry 131 of the motion control device 130 is not limited to a device that includes a CPU and a ROM and executes software processing. That is, the processing circuitry 131 may have any one of the following configurations (a) to (c).

(a) The processing circuitry 131 includes one or more processors that execute various processes in accordance with a computer program. The processor includes a CPU and a memory, such as a RAM and ROM. The memory stores program codes or instructions configured to cause the CPU to execute the processes. The memory, or computer readable medium, includes any type of medium that is accessible by general-purpose computers and dedicated computers.

(b) The processing circuitry 131 includes one or more dedicated hardware circuits that execute various processes. Examples of the dedicated hardware circuits include an application specific integrated circuit (ASIC) and a field programmable gate array (FPGA).

(c) The processing circuitry 131 includes a processor that executes part of various processes in accordance with a computer program and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A motion control device for a vehicle, the vehicle including a steering wheel, wheels that include a front wheel and a rear wheel, a front wheel steering shaft that operates as the steering wheel rotates, a front wheel steering actuator that adjusts a steered angle of the front wheel, a rear wheel steering actuator that adjusts a steered angle of the rear wheel, and a longitudinal force adjustment actuator that adjusts longitudinal forces of the wheels, the motion control device comprising:
 a request value acquisition unit configured to obtain a motion amount request value that is a request value of a motion amount of the vehicle used to turn the vehicle:
 a limit value setting unit configured to set a first motion amount limit value in correspondence with a range that enables the front wheel steering actuator to be activated, set a second motion amount limit value in correspondence with a range that enables the rear wheel steering actuator to be activated, and set a third motion amount limit value in correspondence with a range that enables the longitudinal force adjustment actuator to be activated;
 a first command unit configured to obtain, as a first motion amount command value, a value corresponding to a smaller one of the motion amount request value and the first motion amount limit value and command the front wheel steering actuator to be activated based on the first motion amount command value;
 a second command unit configured to obtain, as a second motion amount command value, a value corresponding to a smaller one of the second motion amount limit value and a first remaining request value obtained by subtracting the first motion amount command value from the motion amount request value and command the rear wheel steering actuator to be activated based on the second motion amount command value; and
 a third command unit configured to obtain, as a third motion amount command value, a value corresponding to a smaller one of the third motion amount limit value and a second remaining request value obtained by subtracting the second motion amount command value from the first remaining request value and command the longitudinal force adjustment actuator to be activated based on the third motion amount command value.

2. The motion control device according to claim 1, wherein
 the vehicle includes:
  a steering lock mechanism configured to selectively switch between an inactive state that permits the steering wheel to rotate and an active state that prohibits the steering wheel from rotating; and
  a rotation angle adjustment actuator including an input shaft that rotates integrally with the steering wheel and an output shaft that rotates as the front wheel steering shaft operates, the rotation angle adjustment actuator being configured to be activated so as to adjust a difference between a rotation angle of the input shaft and a rotation angle of the output shaft,
 the limit value setting unit is configured to set a fourth motion amount limit value in correspondence with a range that enables the rotation angle adjustment actuator to be activated, and
 in a case in which an anomaly has occurred in the front wheel steering actuator, the first command unit is configured to:
  obtain, as the first motion amount command value, a value corresponding to a smaller one of the motion amount request value and the fourth motion amount limit value;
  command the rotation angle adjustment actuator to be activated based on the first motion amount command value; and
  command a state of the steering lock mechanism to be set to the active state.

3. The motion control device according to claim 2, wherein the first command unit is configured to command the state of the steering lock mechanism to be set to the active state when turning the vehicle in a state in which the steered angle of the front wheel is unadjustable.

4. The motion control device according to claim 1, wherein the limit value setting unit is configured to set a motion amount limit value for an actuator in which an anomaly has occurred to zero.

5. The motion control device according to claim 1, wherein
 the limit value setting unit is configured to set a motion amount limit value for an actuator in which an anomaly has occurred to:
 a value corresponding to a current value of an active state value of the actuator when the active state value is obtainable even if an anomaly occurs, the active state value indicating the active state of the actuator; and
 zero when the active state value of the actuator is unobtainable.

6. A non-transitory computer-readable medium that stores a motion control program executed by an execution device of a vehicle, the vehicle including a steering wheel, wheels that include a front wheel and a rear wheel, a front wheel steering shaft that operates as the steering wheel rotates, a front wheel steering actuator that adjusts a steered angle of the front wheel, a rear wheel steering actuator that adjusts a steered angle of the rear wheel, and a longitudinal force adjustment actuator that adjusts longitudinal forces of the wheels, the motion control program causing the execution device to execute:

a request value acquisition process that obtains a motion amount request value that is a request value of a motion amount of the vehicle used to turn the vehicle;

a limit value setting process that sets a first motion amount limit value in correspondence with a range that enables the front wheel steering actuator to be activated, sets a second motion amount limit value in correspondence with a range that enables the rear wheel steering actuator to be activated, and sets a third motion amount limit value in correspondence with a range that enables the longitudinal force adjustment actuator to be activated;

a first command value acquisition process that obtains, as a first motion amount command value, a value corresponding to a smaller one of the motion amount request value and the first motion amount limit value;

a second command value acquisition process that obtains, as a second motion amount command value, a value corresponding to a smaller one of the second motion amount limit value and a first remaining request value obtained by subtracting the first motion amount command value from the motion amount request value;

a third command value acquisition process that obtains, as a third motion amount command value, a value corresponding to a smaller one of the third motion amount limit value and a second remaining request value obtained by subtracting the second motion amount command value from the first remaining request value; and a command process that commands the front wheel steering actuator to be activated based on the first motion amount command value, commands the rear wheel steering actuator to be activated based on the second motion amount command value, and commands the longitudinal force adjustment actuator to be activated based on the third motion amount command value.

7. A motion control method for a vehicle, the vehicle including a steering wheel, wheels that include a front wheel and a rear wheel, a front wheel steering shaft that operates as the steering wheel rotates, a front wheel steering actuator that adjusts a steered angle of the front wheel, a rear wheel steering actuator that adjusts a steered angle of the rear wheel, and a longitudinal force adjustment actuator that adjusts longitudinal forces of the wheels, the motion control method comprising:

obtaining a motion amount request value that is a request value of a motion amount of the vehicle used to turn the vehicle;

setting a first motion amount limit value in correspondence with a range that enables the front wheel steering actuator to be activated;

setting a second motion amount limit value in correspondence with a range that enables the rear wheel steering actuator to be activated;

setting a third motion amount limit value in correspondence with a range that enables the longitudinal force adjustment actuator to be activated;

obtaining, as a first motion amount command value, a value corresponding to a smaller one of the motion amount request value and the first motion amount limit value;

obtaining, as a second motion amount command value, a value corresponding to a smaller one of the second motion amount limit value and a first remaining request value obtained by subtracting the first motion amount command value from the motion amount request value;

obtaining, as a third motion amount command value, a value corresponding to a smaller one of the third motion amount limit value and a second remaining request value obtained by subtracting the second motion amount command value from the first remaining request value;

commanding the front wheel steering actuator to be activated based on the first motion amount command value;

commanding the rear wheel steering actuator to be activated based on the second motion amount command value; and commanding the longitudinal force adjustment actuator to be activated based on the third motion amount command value.

* * * * *